United States Patent
Purekar

(10) Patent No.: US 11,428,187 B2
(45) Date of Patent: Aug. 30, 2022

(54) DUAL RAIL PRESSURE CONTROL FOR ENGINE NOISE IMPROVEMENT

(71) Applicant: Cummins Inc., Columbus, IN (US)

(72) Inventor: Dhanesh M. Purekar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/294,797

(22) PCT Filed: Dec. 12, 2018

(86) PCT No.: PCT/US2018/065152
§ 371 (c)(1),
(2) Date: May 18, 2021

(87) PCT Pub. No.: WO2020/122890
PCT Pub. Date: Jun. 18, 2020

(65) Prior Publication Data
US 2021/0404410 A1  Dec. 30, 2021

(51) Int. Cl.
*F02D 41/30* (2006.01)
*F02D 41/38* (2006.01)
(Continued)

(52) U.S. Cl.
CPC ....... *F02D 41/3836* (2013.01); *F02M 55/025* (2013.01); *F02M 59/12* (2013.01);
(Continued)

(58) Field of Classification Search
CPC ......... F02D 41/3836; F02D 2200/0602; F02D 2200/101; F02D 2200/50; F02M 55/025;
(Continued)

(56) References Cited

U.S. PATENT DOCUMENTS 5,931,052 A  8/1999  Zhao et al.
6,557,530 B1  5/2003  Benson et al.
(Continued)

FOREIGN PATENT DOCUMENTS

WO  2018081115 A1  5/2018

OTHER PUBLICATIONS

International Search Report and Written Opinion issued by the ISA/US, Commissioner for Patents, dated Feb. 26, 2019, for International Application No. PCT/US2018/065152; 10 pages.
(Continued)

*Primary Examiner* — Hai H Huynh
(74) *Attorney, Agent, or Firm* — Faegre, Drinker, Biddle & Reath LLP

(57) ABSTRACT

A method is provided for controlling operation of a fueling system including a fuel pump driven by an engine geartrain and a fuel accumulator supplied fuel by the fuel pump, comprising: determining whether an operating parameter of the engine is less than a threshold value; responding to the operating parameter being less than the threshold value by causing an inlet valve of the fuel pump to operate in a 100 percent fill mode, whereby a pumping chamber in the fuel pump is approximately fully filled for at least one pumping cycle; determining whether a fuel pressure in the fuel accumulator is greater than a desired value while the inlet valve is in the 100 percent fill mode; and responding to the fuel pressure being greater than the desired value by activating an outlet valve of the fuel accumulator to drain fuel in the fuel accumulator to a fuel tank.

23 Claims, 4 Drawing Sheets

(51) Int. Cl.
*F02M 55/02* (2006.01)
*F02M 59/12* (2006.01)
*F02M 59/46* (2006.01)
*F04B 17/05* (2006.01)
*F04B 49/22* (2006.01)
*F04B 53/00* (2006.01)

(52) U.S. Cl.
CPC .......... *F02M 59/466* (2013.01); *F04B 17/05* (2013.01); *F04B 49/22* (2013.01); *F04B 53/006* (2013.01); *F02D 2200/0602* (2013.01); *F02D 2200/101* (2013.01); *F02D 2200/50* (2013.01)

(58) Field of Classification Search
CPC ...... F02M 59/12; F02M 59/466; F04B 17/05; F04B 49/22; F04B 53/006
USPC ....... 123/446, 447, 456, 457, 510, 511, 514; 701/103–105; 73/114.41, 114.42, 114.43
See application file for complete search history.

(56) References Cited

U.S. PATENT DOCUMENTS

| | | | |
|---|---|---|---|
| 7,278,405 B2* | 10/2007 | Takahashi | F02D 41/221 |
| | | | 123/447 |
| 7,490,592 B2 | 2/2009 | Kaneko | |
| 7,690,353 B2 | 4/2010 | Shafer et al. | |
| 7,823,566 B2 | 11/2010 | Fox et al. | |
| 2016/0177842 A1 | 6/2016 | Riepl et al. | |

OTHER PUBLICATIONS

International Preliminary Report on Patentability received for PCT Patent Application No. PCT/US2018/065152, dated Jun. 24, 2021, 10 pages.

* cited by examiner

DUAL RAIL PRESSURE CONTROL FOR ENGINE NOISE IMPROVEMENT

CROSS-REFERENCE TO RELATED APPLICATIONS

The present application is a national stage application of International (PCT) Patent Application Serial No. PCT/US2018/065152, filed on Dec. 12, 2018, the complete disclosure of which is expressly incorporated by reference herein.

FIELD OF THE DISCLOSURE

The present disclosure generally relates to fuel pumping methods and more particularly to systems and methods for controlling fuel pumps that supply a common rail to reduce geartrain noise.

BACKGROUND OF THE DISCLOSURE

Fuel pumps driven by a geartrain powered by an engine crankshaft generate audible noise during operation. Some of this noise is caused by gear rattle or lash in the geartrain, especially during low speed or low torque operation of the engine. Known engine systems use one or more anti-backlash gears in the geartrain to reduce noise. Such anti-backlash gears increase the complexity, weight and cost of the geartrain. Thus, it is desirable to control operation of a geartrain driven fuel pump in a manner that reduces gear rattle noise by does not add to the complexity, weight or cost of the system.

SUMMARY

According to one embodiment, the present disclosure provides a system for controlling operation of a fuel pump coupled to an engine to reduce noise caused by geartrain rattle, comprising: a first sensor in communication with the engine and configured to provide measurements of an engine operating parameter; a second sensor in communication with a fuel accumulator coupled to the engine and configured to provide measurements of fuel pressure within the fuel accumulator; an inlet valve in flow communication with a fuel tank and at least one cylinder of the fuel pump, the cylinder having a plunger configured to move reciprocally within a pumping chamber in response to rotation of a drive shaft coupled to a geartrain powered by the engine; an outlet valve in flow communication with an outlet of the fuel accumulator and the fuel tank; and a controller in communication with the first sensor, the second sensor, the inlet valve and the outlet valve, the controller including a processor and a non-transitory memory including instructions that when executed by the processor, cause the processor to determine an operating condition of the engine in response to a measurement of the engine operating parameter received from the first sensor, respond to the determined operating condition by causing the inlet valve to provide excess fuel to the fuel pump to increase a parasitic load from the fuel pump to the geartrain, thereby reducing gear rattle generated by the geartrain, determine whether a measurement of fuel pressure within the fuel accumulator received from the second sensor is greater than a desired pressure, and respond to a determination that the fuel pressure within the fuel accumulator is greater than the desired pressure by activating the outlet valve to provide fuel from the outlet of the fuel accumulator to the fuel tank, thereby reducing the fuel pressure within the fuel accumulator. In one aspect of this embodiment, the engine operating parameter is one of engine speed or engine torque. In another aspect, the instructions, when executed by the processor, further cause the processor to respond to the determined operating condition by placing the inlet valve in a variable fill mode of operation. In a variant of this aspect, when the inlet valve is in the variable fill mode of operation, the pumping chamber of the fuel pump receives more fuel from the inlet valve than is needed to achieve a desired fuel pressure within the fuel accumulator. In another aspect of this embodiment, the determined operating condition corresponds to the measurement of the engine operating parameter received from the first sensor being either less than a threshold value or greater than the threshold value. In a variant of this aspect, when executed by the processor, further cause the processor to respond to the measurement of the engine operating parameter being less than the threshold value by placing the inlet valve in a 100 percent fill mode of operation. In a further variant, when the inlet valve is in the 100 percent fill mode of operation, the pumping chamber of the fuel pump is approximately fully filled during at least one pumping cycle of the fuel pump. In another variant of this aspect, the instructions, when executed by the processor, further cause the processor to respond to a determination that the measurement of the engine operating parameter is greater than the threshold valve by placing the inlet valve in a normal operation mode. In another variant, the threshold value is one of an engine speed value of approximately 1400 RPM or an engine torque value of approximately 400 foot-pounds. In yet another aspect of this embodiment, the inlet valve is an inlet metering valve and the outlet valve is an electronic dump valve. In still another aspect, the drive shaft is coupled to a pump gear which is coupled in meshing engagement with a cam gear, which is coupled in meshing engagement with a crank gear coupled to a crankshaft of the engine.

In another embodiment of the present disclosure, a controller for controlling operation of a fuel pump to reduce noise generated by a geartrain driving operation of the fuel pump is provided, comprising: a processor in communication with a first sensor that senses an operating parameter of an engine that drives operation of the geartrain, a second sensor that senses pressure of fuel provided by the fuel pump to a fuel accumulator, an inlet valve that meters a flow of fuel from a fuel tank to a pumping chamber of the fuel pump, and an outlet valve that controls a flow of fuel from the fuel accumulator to the fuel tank; and a non-transitory memory including a stored engine operating parameter threshold value, a stored desired pressure value and instructions that when executed by the processor, cause the processor to respond to a determination that the engine operating parameter sensed by the first sensor is less than the stored engine operating parameter threshold by placing the inlet valve in a 100 percent fill mode to increase a load on the geartrain, and while the inlet valve is in the 100 percent fill mode, to respond to a determination that the pressure of fuel provided by the fuel pump to the fuel accumulator sensed by the second sensor is greater than the stored desired pressure value by activating the outlet valve to cause a flow of fuel from the fuel accumulator to the fuel tank. In one aspect of this embodiment, the instructions, when executed by the processor, further cause the processor to receive a measurement of the sensed engine operating parameter from the first sensor, compare the received measurement to the stored engine operating parameter threshold, receive a measurement of the sensed pressure of fuel from the second sensor, and compare the sensed pressure of fuel to the stored desired pressure value. In another aspect, the engine operating parameter is one of engine speed or engine torque. In another aspect, the instructions, when executed by the processor, further cause the processor to respond to a determination that the engine operating parameter sensed by the first sensor is not less than the stored engine operating parameter threshold by placing the inlet valve in a normal operation mode. In still another aspect, when the inlet valve is in the 100 percent fill mode, the pumping chamber of the fuel pump is approximately fully filled during at least one pumping cycle of the fuel pump. In another aspect, the stored engine operating parameter threshold is one of an engine speed value of approximately 1400 RPM or an engine torque value of approximately 400 foot-pounds. In yet another aspect, the inlet valve is an inlet metering valve and the outlet valve is an electronic dump valve. In another aspect of this embodiment, the geartrain includes a drive shaft having a lobe that causes reciprocal movement of a plunger in the pumping chamber, the drive shaft being coupled to a pump gear which is coupled in meshing engagement with a cam gear, which is coupled in meshing engagement with a crank gear coupled to a crankshaft of the engine.

In yet another embodiment, the present disclosure provides a method of controlling operation of a fueling system including a fuel pump driven by an engine geartrain and a fuel accumulator supplied fuel by the fuel pump, the method comprising: determining whether an operating parameter of the engine is less than a predetermined threshold value; responding to the operating parameter being less than the predetermined threshold value by causing an inlet valve of the fuel pump to operate in a 100 percent fill mode, whereby a pumping chamber in the fuel pump is approximately fully filled for at least one pumping cycle of the fuel pump; determining whether a fuel pressure in the fuel accumulator is greater than a desired pressure value while the inlet valve is in the 100 percent fill mode; and responding to the fuel pressure being greater than the desired pressure value by activating an outlet valve of the fuel accumulator, whereby excess fuel in the fuel accumulator is drained to a fuel tank. In one aspect of this embodiment, determining whether an operating parameter of the engine is less than a predetermined threshold value includes receiving a measurement of the operating parameter at a controller and comparing the measurement of the operating parameter to the predetermined threshold value, and determining whether a fuel pressure in the fuel accumulator is greater than a desired pressure value includes receiving a measurement of the fuel pressure at the controller and comparing the measurement of the fuel pressure to the desired pressure value. In another aspect, the operating parameter of the engine is one of engine speed or engine torque. In a variant of this aspect, the predetermined threshold value is one of an engine speed value of approximately 1400 RPM or an engine torque value of approximately 400 foot-pounds. Yet another aspect further comprises responding to the operating parameter being greater than the predetermined threshold value by causing the inlet valve to operate in a normal operation mode.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Figure 1:
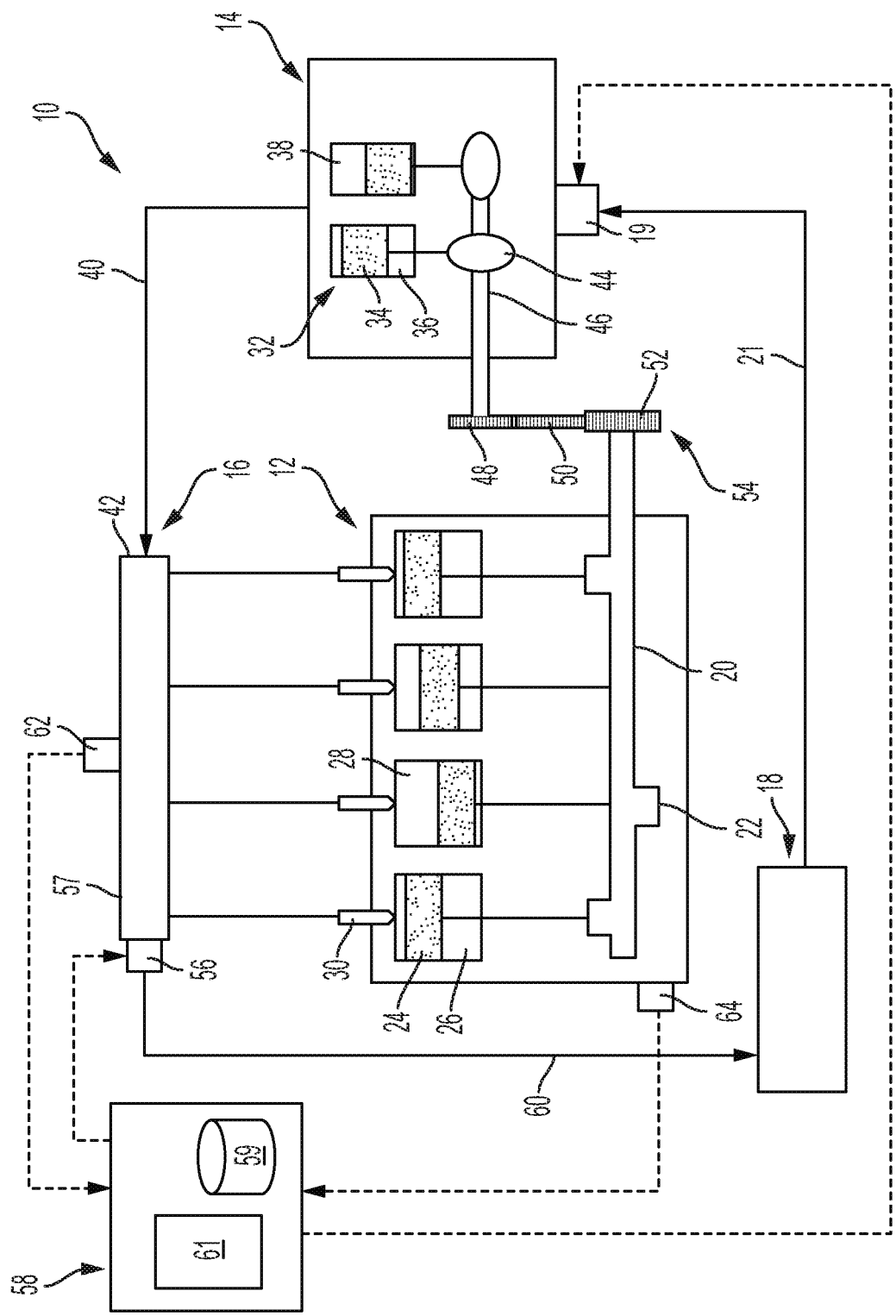
FIG. 1 is a block diagram of an engine system according to one embodiment of the present disclosure.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Referring now to FIG. 1, a conceptual diagram of an engine system is shown. System 10 generally includes an engine 12, a fuel pump 14, a common rail fuel accumulator 16 and a fuel tank 18. Engine 12 may be any type of internal combustion engine including a gasoline engine, a diesel engine, a dual-fuel engine, or any other internal combustion engine known in the art. Engine 12 includes, among other component, a crankshaft 20 which includes a plurality of cam lobes 22, each cam lobe 22 being coupled to a piston 24 mounted for reciprocal motion within a cylinder 26. Each cylinder 26 defines (with the crown surface of the corresponding piston 24) a combustion chamber 28 into which a fuel (or fuel/air mix) is supplied by one or more fuel injectors 30.

Fuel pump 14 generally includes one or more pumping elements 32 (two shown), each including a plunger 34 mounted for reciprocal motion in a pumping cylinder 36. Each pumping element 32 is coupled to fuel tank 18 through an inlet valve, such as an inlet metering valve ("IMV") 19 and one or more supply lines 21 and draws fuel into a pumping chamber 38 of the pumping cylinder 36. Each pumping element 32 is further configured to pump pressurized fuel from the pumping chamber 38 through one or more fuel lines 40 to an input 42 of common rail 16. Each plunger 34 is coupled to a cam lobe 44 of a drive shaft 46 and reciprocates in response to the eccentric shape of the cam lobe 44 as drive shaft 46 rotates. Drive shaft 46 is coupled to a fuel pump gear 48 and rotates as a result of rotation of fuel pump gear 48. Fuel pump gear 48 is in meshing engagement with a cam gear 50, which is in meshing engagement with a crank gear 52 coupled to crankshaft 20. Fuel pump gear 48, cam gear 50 and crank gear 52 are collectively referred to as geartrain 54. It should be understood, however, that various other gear configurations may be used. Thus, as crankshaft 20 rotates in response to movement of pistons 24 under power of combustion of fuel in combustion chambers 28, the rotational motion is transferred to drive shaft 46 of fuel pump 14 through geartrain 54, thereby causing reciprocation of pumping elements 32. The reciprocation of pumping elements 32 draws fuel from fuel tank 18 through IMV 19 into pumping chambers 38 and forces pressurized fuel out of fuel pump 14 to common rail 16.

An outlet valve such as an electronic dump valve ("EDV") 56 is coupled to an outlet 57 of common rail 16. EDV 56 is controlled by a controller 58 (as indicated by the dashed arrow) to release a controlled amount of fuel from common rail 16 though return line 60 back to fuel tank 18 in the manner described below. Additionally, IMV 19 is controlled by controller 58 (as indicated by the dashed arrow) to permit a controlled quantity of fuel from fuel tank 18 to enter pumping chambers 38 of fuel pump 14. In certain embodiments, controller 58 controls EDV 56 and IMV 19 in response to pressure measurements of the pressure in common rail 16 provided by a pressure sensor 62 (as indicated by the dashed arrow) and measurements of an engine parameter (such as engine speed and/or engine torque) provided by an engine sensor 64 (as indicated by the dashed arrow).

In certain embodiments, controller 58 may be an engine control module ("ECM") or other similar device or system, and can include a non-transitory memory 59 having instructions that, in response to execution by a processor 61, cause processor 61 to determine a speed or torque value of engine 12 based on input measurements from sensor 64. Processor 61, non-transitory memory 59, and controller 58 are not particularly limited and can, for example, be physically separate.

In certain embodiments, controller 58 can form a portion of a processing subsystem including one or more computing devices having memory, processing, and communication hardware. Controller 58 can be a single device or a distributed device, and functions of controller 58 can be performed by hardware and/or as computer instructions on a non-transient computer readable storage medium, such as non-transitory memory 59.

In certain embodiments, controller 58 includes one or more interpreters, determiners, evaluators, regulators, and/or processors 61 that functionally execute the operations of controller 58. The description herein including interpreters, determiners, evaluators, regulators, and/or processors emphasizes the structural independence of certain aspects of controller 58 and illustrates one grouping of operations and responsibilities of controller 58. Other groupings that execute similar overall operations are understood to be within the scope of the present disclosure. Interpreters, determiners, evaluators, regulators, and processors can be implemented in hardware and/or as computer instructions on a non-transient computer readable storage medium, and can be distributed across various hardware or computer-based components.

Example and non-limiting implementation elements that functionally execute the operations of controller 58 include sensors, such as engine sensor 64, providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In general, during operation of engine system 10 various undesirable noises are produced. For example, fuel pump 14 produces undesirable noise as a result of hydraulic compression of fuel in pumping chambers 38 when pumping chambers 38 are partially filled. This pumping noise is generated when plungers 34 impact the fuel in pumping chamber 38. Partial filling of pumping chambers 38 also results in noise from geartrain 54. When pumping chambers 38 are only partially filled, the load on geartrain 54 is reduced, and the reduced parasitic load results in gear rattle or lash, which generates noise.

Figure 2:
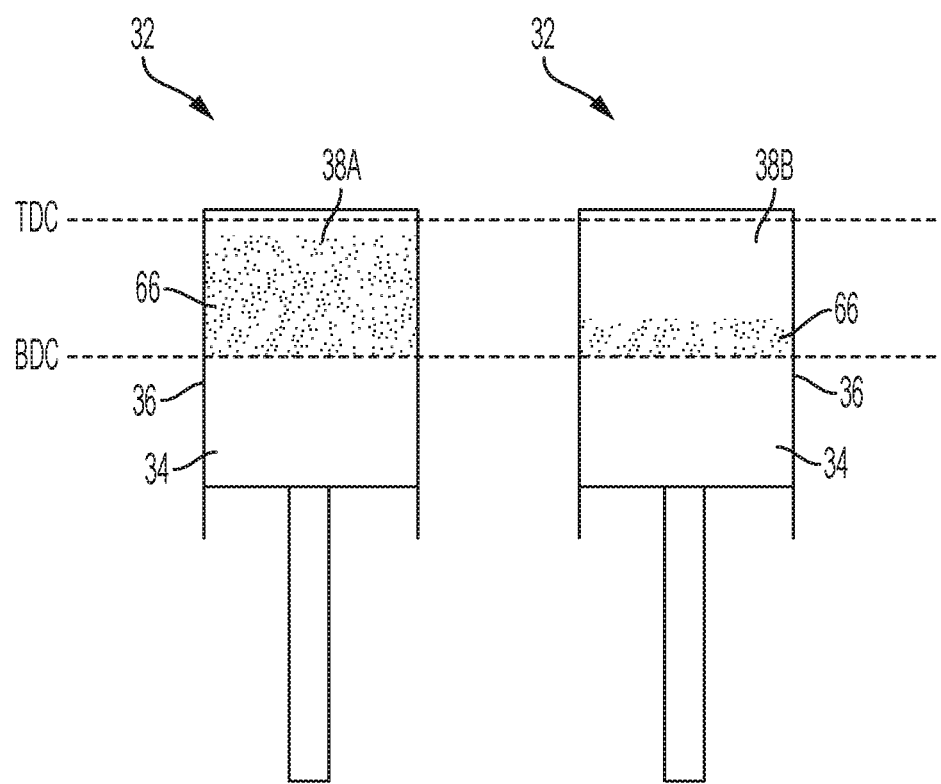
FIG. 2 is a conceptual diagram of pumping chambers of a fuel pump.

FIG. 2 depicts both a fully filled pumping chamber 38A of a pumping element 32 of a fuel pump 14 and a partially filled pumping chamber 38B of another pumping element 32. In both depicted pumping chambers 38A, 38B, plunger 34 is shown in its bottom-dead-center ("BDC") position. In pumping chamber 38A, fuel 66 nearly fills pumping chamber 38A entirely to the top-dead-center ("TDC") position of plunger 34. When plunger 34 moves upwardly, throughout nearly the entire stroke toward the TDC position, a load is placed on the corresponding cam lobe 44 of drive shaft 46. This load is transferred to geartrain 54 and causes pump gear 48 to stay in contact with cam gear 50 and cam gear 50 to stay in contact with crank gear 52, thereby reducing the gear rattle generated by geartrain 54. In pumping chamber 38B, on the other hand, fuel 66 only partially fills pumping chamber 38B. Thus, when plunger 34 moves toward the TDC position, relatively little load is placed on geartrain 54 until plunger 34 nearly reaches the TDC position. Consequently, geartrain 54 generates undesirable gear rattle noise and when plunger 34 impacts fuel 66, additional noise is produced.

Referring back to FIG. 1, engine sensor 64 is described herein as providing measurements of an engine operating parameter to controller 58. In the examples provided herein, engine sensor 64 provides measurements of the speed of operation of engine 12 and/or the amount of torque generated by engine 12. It should be understood, however, that other engine operating parameters may be provided by engine sensor 64 and used by controller 58 to control the operation of IMV 19 in the manner described herein. In one embodiment of the present disclosure, when controller 58 determines from engine sensor 64 that engine 12 is operating at idle speed, controller 58 causes IMV 19 to fully open (i.e., to enter a 100 percent fill mode) to permit approximately 100 percent filling of pumping chambers 38 for at least one pumping cycle of fuel pump 14. As used herein, the phrases "approximately 100 percent filled," "nearly fully filled," and similar phrases are intended to mean that the pumping chamber 38 is provided with fuel by IMV 19 in an amount for a particular pumping cycle that is at least more fuel than is required to maintain a desired pressure in common rail 16 during the pumping cycle and at most enough fuel to completely fill the pumping chamber 38. As explained above, this over filling of pumping chambers 38 increases the parasitic load on geartrain 54, thereby reducing rattle and the corresponding noise. However, 100 percent filling of pumping chambers 38 for every pumping cycle will result in excess pressure of the fuel in common rail 16. Thus, controller 58 also controls EDV 56 in response to pressure measurements provided by pressure sensor 62 to maintain fuel pressure in common rail 16 within a desired pressure range or at a desired pressure. The excess fuel drained from EDV 56 is returned to fuel tank 18 through return line 60.

Controller 58 may maintain IMV 19 in the 100 percent fill mode of operation and provide corresponding control of EDV 56 to regulate fuel pressure in common rail 16 as the speed of engine 12 as measured by engine sensor 64 increases to a threshold speed value or the torque as measured by engine sensor 64 increases to a threshold torque value. For example, in one embodiment IMV 19 is maintained in the 100 percent fill mode of operation by controller 58 until the speed of engine 12 reaches approximately 1400 RPM. For speeds above 1400 RPM in this embodiment, controller 58 controls IMV 19 in a normal operation mode, causing pumping chambers 38 to receive a desired quantity of fuel according to principles that are known in the art. In another embodiment, IMV 19 is maintained in the 100 percent fill mode of operation by controller 58 until the torque generated by engine 12 reaches approximately 400 foot-pounds. For torque above 400 foot-pounds in this embodiment, controller 58 controls IMV 19 in the normal operation mode.

Figure 3:
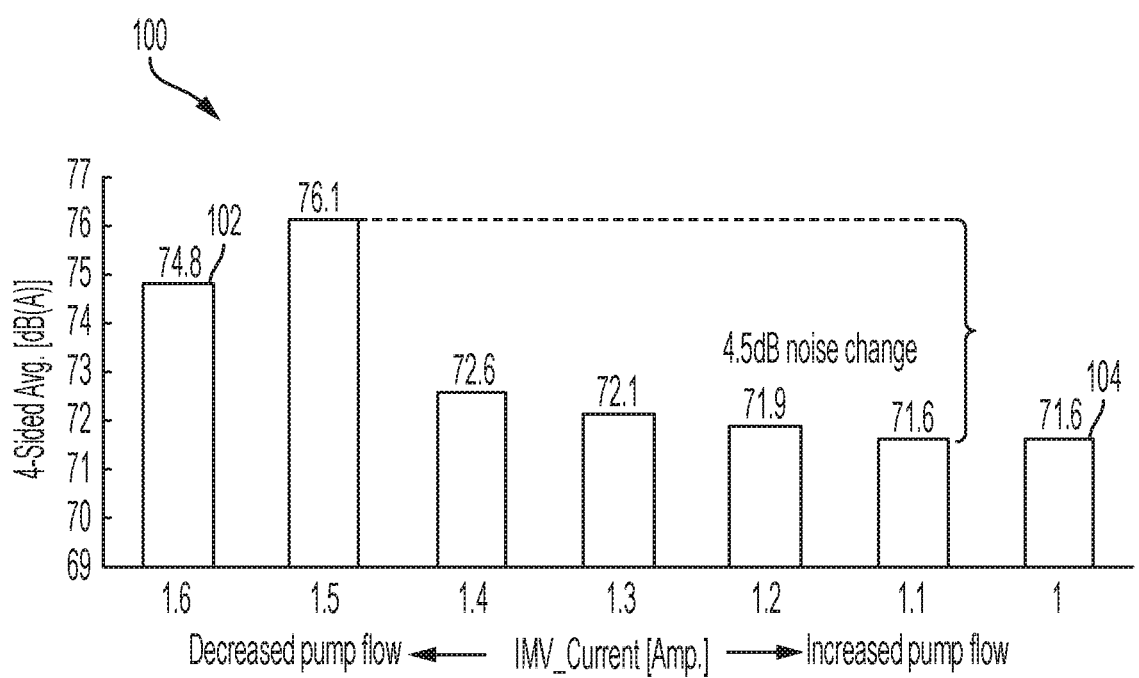
FIG. 3 is a chart depicting noise generated by a fuel pump in relation to various positions of an inlet metering valve coupled to the fuel pump.

Referring now to FIG. 3, a chart is shown of gear rattle noise as IMV 19 is controlled by controller 58 between a nearly fully closed position and a nearly fully opened position. The x-axis of chart 100 is in units of amperes of current provided to IMV 19 during operation. As the current provided to IMV 19 is increased, IMV 19 moves toward a more closed position, providing a decreased amount of fuel to pumping chambers 38 of fuel pump 14. As the current provided to IMV 19 is decreased, IMV 19 moves toward a more opened position, providing an increased amount of fuel to pumping chambers 38. As indicated by bar 102, when 1.6 amperes of current are provided to IMV 19 the flow of fuel through fuel pump 14 is very low because IMV 19 is nearly closed. Bar 104 corresponds to an input current of 1.0 amperes to IMV 19, which corresponds to the 100 percent fill mode of operation because IMV 19 is nearly fully opened.

As shown in chart 100, the noise measured (in decibels) when IMV 19 is nearly closed (input current of 1.6 and 1.5 amperes) is relatively high, 74.8 decibels and 76.1 decibels, respectively. The measured noise decreases as IMV 19 is controlled to increasingly opened positions corresponding to increased fuel flow to pumping chambers 38. When 1.1 amperes of current is provided to IMV 19 (which corresponds to the 100 percent fill mode of operation of fuel pump 14), the noise generated from operation of fuel pump 14 (including noise from rattle of geartrain 54) is reduced by 4.5 decibels (relative to the highest measured noise) to 71.6 decibels.

Figure 4:
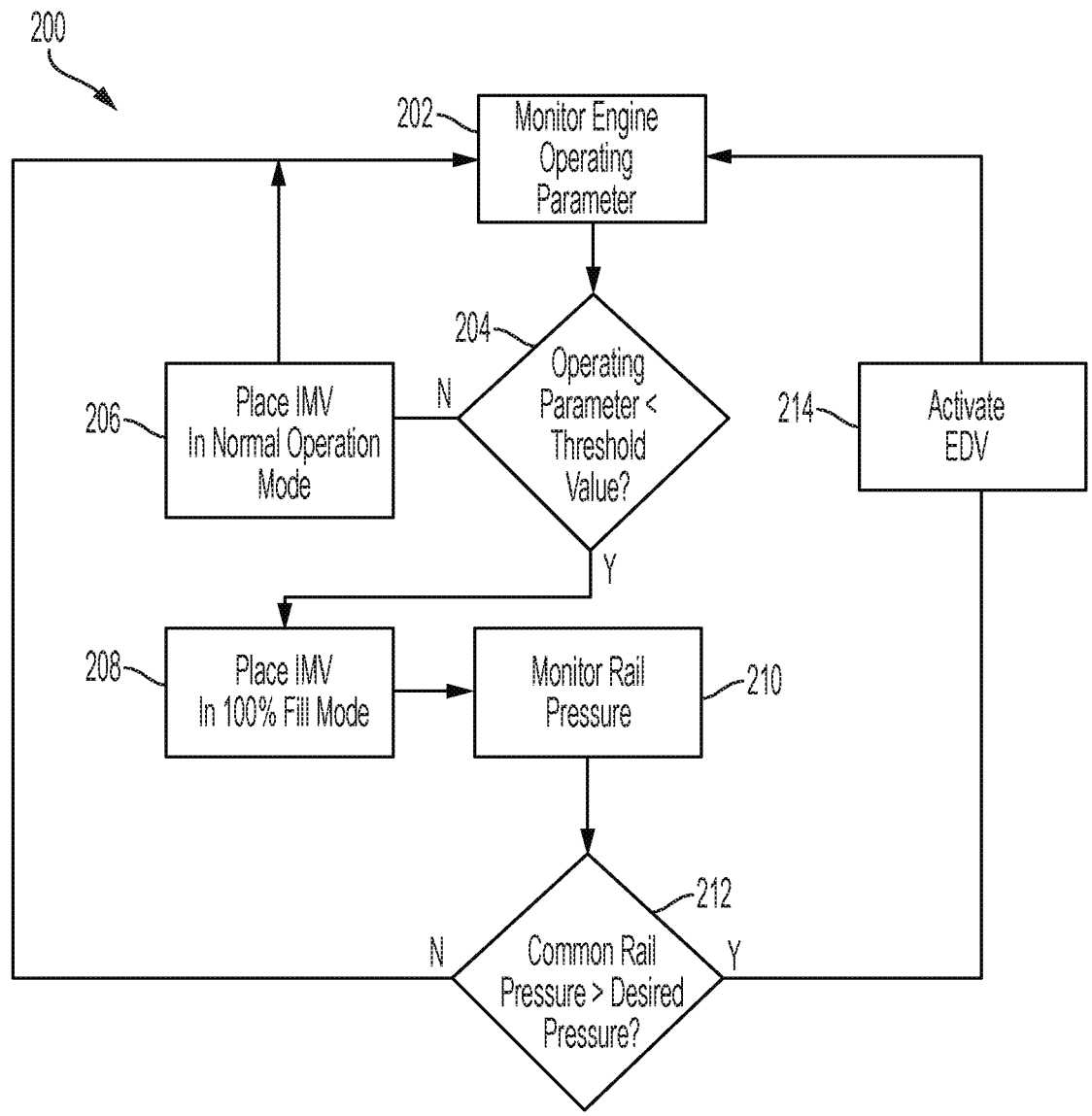
FIG. 4 is a flow chart of a method of controlling operation of a fueling system according to one embodiment of the present disclosure.

Referring now to FIG. 4, a method 200 for controlling a fuel system according to one embodiment of the present disclosure is shown. In method 200, the operation of engine 12 is monitored by controller 58 at block 202 by receiving measurements of an engine operating parameter from engine sensor 64. As indicated above, engine sensor 64 may provide engine speed measurements and/or engine torque measurements. As low speed and/or low torque operation of engine 12 result in the highest noise from gear rattle of geartrain 54 (because of low parasitic loading provided by fuel pump 14), controller 58 monitors one or both of these parameters to determine when to operate IMV 19 in the 100 percent fill mode. At block 204, controller 58 determines whether the measured operating parameter is less than a predetermined threshold value. If the operating parameter is not less than the predetermined threshold value, then controller 58 places IMV 19 in the normal operation mode at block 206 wherein IMV 19 is controlled to deliver a desired quantity of fuel to pumping chambers 38 in a manner known to those skilled in the art. Method 200 then returns to block 202 where controller 58 monitors the engine operating parameter. If the engine operating parameter is less than the predetermined threshold value at block 204 (e.g., engine 12 is operating at low speed or generating low torque), then controller 58 places IMV 19 in the 100 percent fill mode of operation at block 208. As indicated above, when IMV 19 is in the 100 percent fill mode, IMV 19 is nearly completely opened such that pumping chambers 38 are nearly entirely filled during each pumping stroke, thereby increasing the parasitic load of fuel pump 14 on geartrain 54 and reducing the noise generated by gear rattle.

When IMV 19 is in the 100 percent fill mode, at block 210 controller 58 monitors the pressure of common rail 16 by receiving pressure measurements from pressure sensor 62. At block 212, controller 58 determines from the pressure measurements from pressure sensor 62 whether the pressure of fuel in common rail 16 exceeds a desired pressure value. If the pressure of fuel in common rail 16 does not exceed the desired pressure value, then method 200 returns to block 202 and the above-described process is repeated. If the pressure of fuel in common rail 16 exceeds the desired pressure value, then controller 58 activates EDV 56 at block 214 to dump excess fuel from common rail 16 to fuel tank 18 via return line 60. Method 200 then returns to block 202 and the above-described process is repeated.

In an alternative embodiment, controller 58 operates IMV 19 in a variable fill mode, wherein the quantities of fuel provided to pump 14 by IMV 19 may be greater than the quantities of fuel provided to pump 14 when operating in the normal mode and less than the quantities of fuel provided to pump 14 when operating in the 100 percent fill mode. As indicated above, conventional systems may use anti-backlash gears to reduce noise generated by geartrain 54, but such an approach adds weight, is complex and adds cost. Additionally, anti-backlash gears generally include a spring element that applies a biasing force to a corresponding gear (e.g., fuel pump gear 48) to cause the gear to remain in substantially constant contact with a mating gear (e.g., cam gear 50). The biasing force applied by the spring element is generally substantially constant, and therefore under certain operating conditions, more force than is desirable may be applied, reducing the efficiency of the engine system. Under other operating conditions, less force than is desirable may be applied, permitting geartrain noise. Using the principles of the present disclosure, a variable amount of parasitic load may be applied to geartrain 54 by operating IMV 19 in the variable mode to control the flow of fuel to pump 14 (and therefore the parasitic load applied by pump 14 to geartrain 54) in response to the engine operating conditions determined by controller 58.

More specifically, controller 58 may determine the current operating condition of engine 12 based on information from engine sensor 64 and/or other sensors. Given a determined operating condition, controller 58 may access a look-up table in memory 59 or execute an algorithm (or both) to determine the amount of fuel IMV 19 should provide to pump 14 to result in a particular parasitic load to geartrain 54 that will result in reduced geartrain noise but will not overload geartrain 54 and unnecessarily drain power generated by engine 12. As the current operating conditions of engine 12 change (e.g., as speed and/or torque change), the target parasitic load (and therefore the target quantity of fuel supplied to pump 14) changes. Of course, controller 58 also simultaneously controls EDV 56 in the manner described above to maintain a desired pressure (or pressure range) within common rail 16. In this manner, controller 58 operates IMV 19 and pump 14 to function as a variable force anti-backlash gear which reduces noise across a range of engine operating conditions while avoiding unnecessary loading of geartrain 54 and the corresponding losses in efficiency.

It should be understood that the predetermined engine operating parameter threshold value, the desired pressure value of fuel pressure in common rail 16, and/or the target parasitic load information when operating in the variable fill mode may be stored in a memory device accessible by controller 58 (e.g., memory 59) and/or generated during operation using an algorithm or derivation sequence in response to operating parameters of the engine system 10. Controller 58 may adjust these values to accommodate variations in the operating environment such as changes in temperature or emissions requirements. It should further be understood that method 200 is depicted in highly simplified form for purposes of explanation. The various steps depicted in FIG. 4 need not be performed in the order shown and may be performed in parallel rather than in a particular sequence.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling operation of a fuel pump coupled to an engine to reduce noise caused by geartrain rattle, comprising:
   a first sensor in communication with the engine and configured to provide measurements of an engine operating parameter;
   a second sensor in communication with a fuel accumulator coupled to the engine and configured to provide measurements of fuel pressure within the fuel accumulator;
   an inlet valve in flow communication with a fuel tank and at least one cylinder of the fuel pump, the cylinder having a plunger configured to move reciprocally within a pumping chamber in response to rotation of a drive shaft coupled to a geartrain powered by the engine;

an outlet valve in flow communication with an outlet of the fuel accumulator and the fuel tank; and a controller in communication with the first sensor, the second sensor, the inlet valve and the outlet valve, the controller including a processor and a non-transitory memory including instructions that when executed by the processor, cause the processor to determine an operating condition of the engine in response to a measurement of the engine operating parameter received from the first sensor, respond to the determined operating condition by causing the inlet valve to provide excess fuel to the fuel pump such that the pumping chamber receives more fuel from the inlet valve than is needed to achieve a desired fuel pressure within the fuel accumulator thereby increasing a parasitic load from the fuel pump to the geartrain, thereby reducing gear rattle generated by the geartrain, determine whether a measurement of fuel pressure within the fuel accumulator received from the second sensor is greater than the desired fuel pressure, and respond to a determination that the fuel pressure within the fuel accumulator is greater than the desired fuel pressure by activating the outlet valve to provide fuel from the outlet of the fuel accumulator to the fuel tank, thereby reducing the fuel pressure within the fuel accumulator.

2. The system of claim 1, wherein the engine operating parameter is one of engine speed or engine torque.

3. The system of claim 1, wherein the instructions, when executed by the processor, further cause the processor to respond to the determined operating condition by placing the inlet valve in a variable fill mode of operation.

4. The system of claim 1, wherein the determined operating condition corresponds to the measurement of the engine operating parameter received from the first sensor being either less than a threshold value or greater than the threshold value.

5. The system of claim 4, wherein the instructions, when executed by the processor, further cause the processor to respond to the measurement of the engine operating parameter being less than the threshold value by placing the inlet valve in a 100 percent fill mode of operation.

6. The system of claim 5, wherein when the inlet valve is in the 100 percent fill mode of operation, the pumping chamber of the fuel pump is approximately fully filled during at least one pumping cycle of the fuel pump.

7. The system of claim 4, wherein the instructions, when executed by the processor, further cause the processor to respond to a determination that the measurement of the engine operating parameter is greater than the threshold value by placing the inlet valve in a normal operation mode.

8. The system of claim 4, wherein the threshold value is one of an engine speed value of approximately 1400 RPM or an engine torque value of approximately 400 foot-pounds.

9. The system of claim 1, wherein the inlet valve is an inlet metering valve and the outlet valve is an electronic dump valve.

10. The system of claim 1, wherein the drive shaft is coupled to a pump gear which is coupled in meshing engagement with a cam gear, which is coupled in meshing engagement with a crank gear coupled to a crankshaft of the engine.

11. A controller for controlling operation of a fuel pump to reduce noise generated by a geartrain driving operation of the fuel pump, comprising:

a processor in communication with a first sensor that senses an operating parameter of an engine that drives operation of the geartrain, a second sensor that senses pressure of fuel provided by the fuel pump to a fuel accumulator, an inlet valve that meters a flow of fuel from a fuel tank to a pumping chamber of the fuel pump, and an outlet valve that controls a flow of fuel from the fuel accumulator to the fuel tank; and a non-transitory memory including a stored engine operating parameter threshold value, a stored desired pressure value and instructions that when executed by the processor, cause the processor to respond to a determination that the engine operating parameter sensed by the first sensor is less than the stored engine operating parameter threshold by placing the inlet valve in a 100 percent fill mode wherein the pumping chamber receives more fuel from the inlet valve than is needed to achieve the stored desired pressure value to thereby increase a load on the geartrain, and while the inlet valve is in the 100 percent fill mode, to respond to a determination that the pressure of fuel provided by the fuel pump to the fuel accumulator sensed by the second sensor is greater than the stored desired pressure value by activating the outlet valve to cause a flow of fuel from the fuel accumulator to the fuel tank.

12. The controller of claim 11, wherein the instructions, when executed by the processor, further cause the processor to receive a measurement of the sensed engine operating parameter from the first sensor, compare the received measurement to the stored engine operating parameter threshold, receive a measurement of the sensed pressure of fuel from the second sensor, and compare the sensed pressure of fuel to the stored desired pressure value.

13. The controller of claim 11, wherein the engine operating parameter is one of engine speed or engine torque.

14. The controller of claim 11, wherein the instructions, when executed by the processor, further cause the processor to respond to a determination that the engine operating parameter sensed by the first sensor is not less than the stored engine operating parameter threshold by placing the inlet valve in a normal operation mode.

15. The controller of claim 11, wherein when the inlet valve is in the 100 percent fill mode, the pumping chamber of the fuel pump is approximately fully filled during at least, one pumping cycle of the fuel pump.

16. The controller of claim 11, wherein the stored engine operating parameter threshold is one of an engine speed value of approximately 1400 RPM or an engine torque value of approximately 400 foot-pounds.

17. The controller of claim 11, wherein the inlet valve is an inlet metering valve and the outlet valve is an electronic dump valve.

18. The controller of claim 11, wherein the geartrain includes a drive shaft having a lobe that causes reciprocal movement of a plunger in the pumping chamber, the drive shaft being coupled to a pump gear which is coupled in meshing engagement with a cam gear, which is coupled in meshing engagement with a crank gear coupled to a crankshaft of the engine.

19. A method of controlling operation of a fueling system including a fuel pump driven by an engine geartrain and a fuel accumulator supplied fuel by the fuel pump, the method comprising:

determining whether an operating parameter of the engine is less than a predetermined threshold value;

responding to the operating parameter being less than the predetermined threshold value by causing an inlet valve of the fuel pump to operate in a 100 percent fill mode wherein a pumping chamber in the fuel pump receives more fuel from the inlet valve than is needed to achieve a desired fuel pressure value within the fuel accumulator to increase a parasitic load from the fuel pump to the engine geartrain, whereby the pumping chamber in the fuel pump is approximately fully filled for at least one pumping cycle of the fuel pump;

determining whether a fuel pressure in the fuel accumulator is greater than the desired fuel pressure value while the inlet valve is in the 100 percent fill mode; and responding to the fuel pressure being greater than the desired fuel pressure value by activating an outlet valve of the fuel accumulator, whereby excess fuel in the fuel accumulator is drained to a fuel tank.

20. The method of claim 19, wherein determining whether an operating parameter of the engine is less than a predetermined threshold value includes receiving a measurement of the operating parameter at a controller and comparing the measurement of the operating parameter to the predetermined threshold value, and determining whether a fuel pressure in the fuel accumulator is greater than a desired pressure value includes receiving a measurement of the fuel pressure at the controller and comparing the measurement of the fuel pressure to the desired pressure value.

21. The method of claim 19, wherein the operating parameter of the engine is one of engine speed or engine torque.

22. The method of claim 21, wherein the predetermined threshold value is one of an engine speed value of approximately 1400 RPM or an engine torque value of approximately 400 foot-pounds.

23. The method of claim 19, further comprising responding to the operating parameter being greater than the predetermined threshold value by causing the inlet valve to operate in a normal operation mode.

* * * * *